United States Patent [19]

Pease

[11] Patent Number: 4,667,892
[45] Date of Patent: May 26, 1987

[54] DOWNRIGGER UP STOP

[75] Inventor: Eugene D. Pease, Muskegon Heights, Mich.

[73] Assignee: S & K Products, Inc., Muskegon, Mich.

[21] Appl. No.: 755,843

[22] Filed: Jul. 17, 1985

[51] Int. Cl.⁴ .................. B65H 75/34; A01K 89/017; A01K 91/00
[52] U.S. Cl. ..................... 242/106; 43/27.4; 254/270
[58] Field of Search ........................ 242/106; 254/270; 43/27.4, 26.1, 22

[56] References Cited

U.S. PATENT DOCUMENTS

| | | | |
|---|---|---|---|
| 2,709,867 | 6/1955 | Routh | 43/15 |
| 3,835,571 | 9/1974 | Berry | 43/21 |
| 3,910,524 | 10/1975 | Ireland | 242/106 |
| 4,050,180 | 9/1977 | King | 242/106 |
| 4,191,340 | 3/1980 | Kubanek | 242/54 R |
| 4,248,002 | 2/1981 | McNellis | 242/106 |
| 4,339,811 | 7/1982 | Bednarz | 367/96 |
| 4,376,350 | 3/1983 | Bednarz | 43/26.1 |

Primary Examiner—Billy S. Taylor
Attorney, Agent, or Firm—Miller, Morriss & Pappas

[57] ABSTRACT

A downrigger UP stop for powered downriggers used primarily in fishing in which a nonconductive link is located in a cable line to the weight, mass or cannonball. A flow of current through the cable, water and boat is sensed by a sensing control circuit and the sensing of water when the circuit is directed to lift the cable functions until the nonconductive link breaks that continuity. The winch then stops and in a selected position by the fisherman. On dropping the weight again into the water, the atuomatic UP stop is in operating control. The UP motion can always be manually stopped by energizing the DOWN button and it can be restarted for automatic ascent.

6 Claims, 4 Drawing Figures

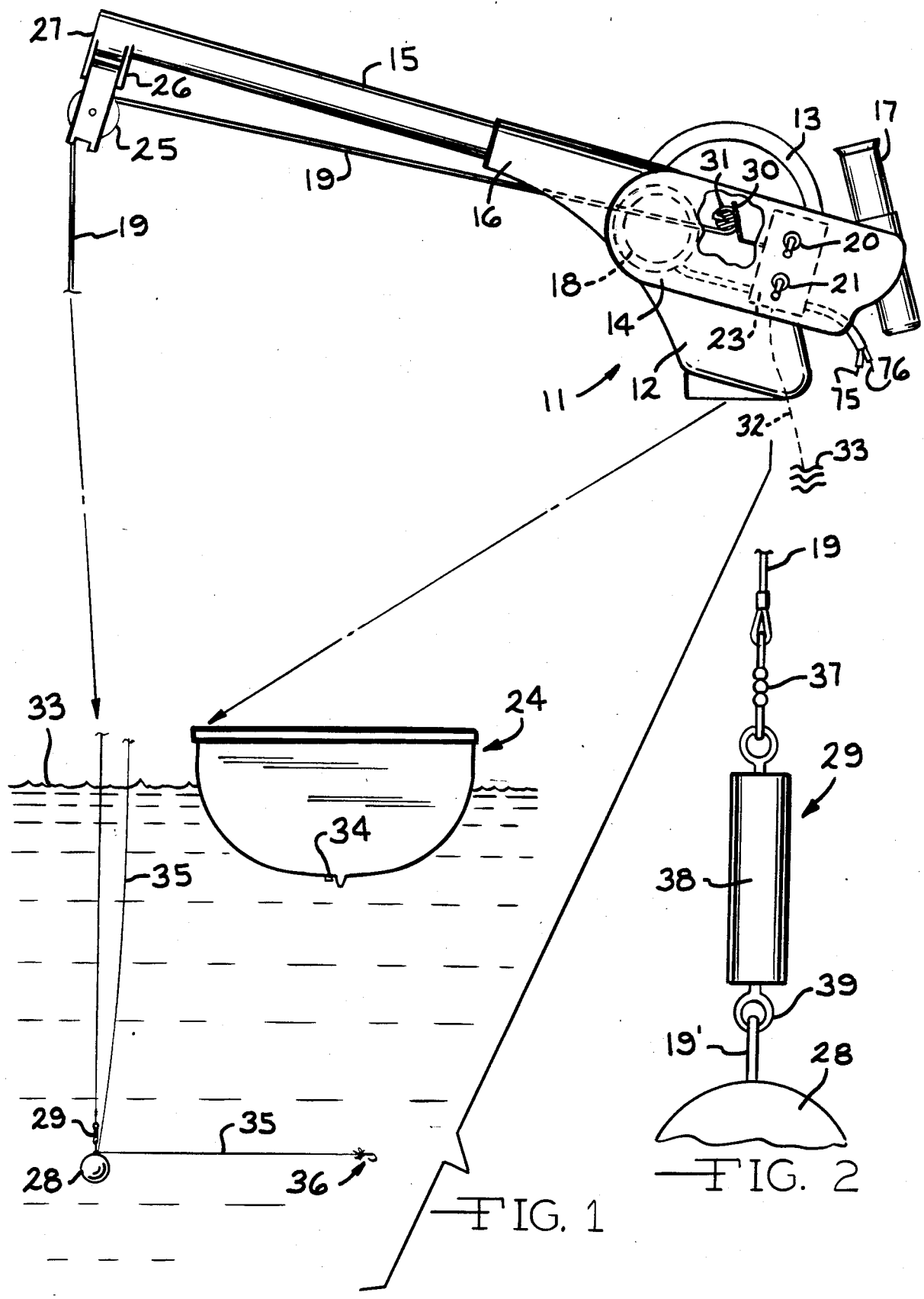

DOWNRIGGER UP STOP

The present invention relates to a new and useful powered downrigger for fishing and to power winches for lowering and raising weights or masses from the water. More particularly, it relates to a highly reliable system for permitting controlled elevation of the weight and stopping of the power winch when the cable lifting the weight or mass reaches a predetermined point and sensing that point electrically by employing the conductivity of immersed cable and water and a nonconducting cable connector between the cable and the mass. An electrical signal is created by passing direct current electrical energy through the cable and with the water closing the consequent electrical signal circuit to the boat or mounting on which the winch is located. The electrical signal is continuous so long as the cable is in the water, as in the situation where a trolling weight has been lowered to a specific fishing depth. When the weight or mass is to be raised, the power circuit to the drive winch is manually engaged by the operator activating the "UP" button. The winch continues the lifting operation until the cable raises a nonconducting link from the water. Upon this occurring, the drive circuit to the winch is broken by electronic controls which sense the break in conduction continuity and the cable ceases in its ascent. This is markedly advantageous to fishermen since the weight or mass ascends without any constant attention and stops at a selected point determined by location of the nonconductive link. This occurs when changing lures or when reattaching a fishing line to the mass or weight, as is repetitive in downrigger fishing.

By freeing the fisherman from direct observation of the lifting of the mass, the fisherman is free to occupy himself with other important fishing tasks, as preparation of bait, selection of types of bait, and simple navigational control where the boat or vessel is pitching and rolling in chop or a heavy sea.

In general, the prior art has involved relatively constant personal control over the lifting of the mass or weight, although it is known to utilize physical stops, limit switches, and depth or elevation systems requiring adjustment of the stops and all such devices tended to radically overrun the stop points.

In the U.S. Pat. No. 3,835,571 to Arthur E. Berry, the depth counter must be monitored or the water must be observed during lifting of the sinker 81. This is also true in the structure explained in U.S. Pat. No. 3,910,524 to Harold Ireland. In the U.S. Pat. Nos. 4,339,811 and 4,376,350 to John Bednarz, et al, a sonar system monitors control depth of the weight and a digital counter read-out establishes a visible indicia of depth of the weight and employs a magnetic counter indexed by operator manipulation. The latter unit is directed to a system for raising to a predetermined point in the region of the surface of the water without constant attendance by an operator. This system relies upon a memory setting at zero and return to that point. The latter devices come as close as any to the present invention but utilize a highly complex and sensitive circuitry for control and are more expensive to construct than the control of applicant. In the powered fishing reels of U.S. Pat. No. 2,709,867 to F. L. Routh, physical stop means prevent overrun of the lifting of the line by engagement of a stop against a lever which disconnects the power to the drive. In U.S. Pat. No. 4,191,340 to Emil Kubanek, the mode of stopping is by limit switches with cam actuation.

Accordingly, the principal object of the present invention is to provide a downrigger UP stop that is electrical, reliable, and which utilizes a simple nonconducting link to signal the cessation of driving of a winch to pick up a trolling mass or weight.

Another object is to provide a signal that is automatic requiring no calibration and no complex circuitry or mechanical/electrical limits, switches or stops.

Another object is to provide an electrical downrigger UP stop that allows electronic miniaturization of circuitry permitting its inclusion in the operating base of a downrigger and simplified connection to the cable at the spool shaft and grounding of the circuit through the bottom of the craft, boat or mounting on which the downrigger is installed and thence to the water.

IN THE DRAWINGS

FIG. 1 is a somewhat schematic elementary diagram of a boat in water as used for fishing and on which is mounted the power driven downrigger of the present invention and showing the typical rigging of a powered downrigger with an electrical insulating or nonconducting connector between the mass or weight and the cable.

FIG. 2 is an enlarged fragmental elevation view of the nonconducting connector selectively located at the end of the cable.

GENERAL DESCRIPTION

Figure 3:
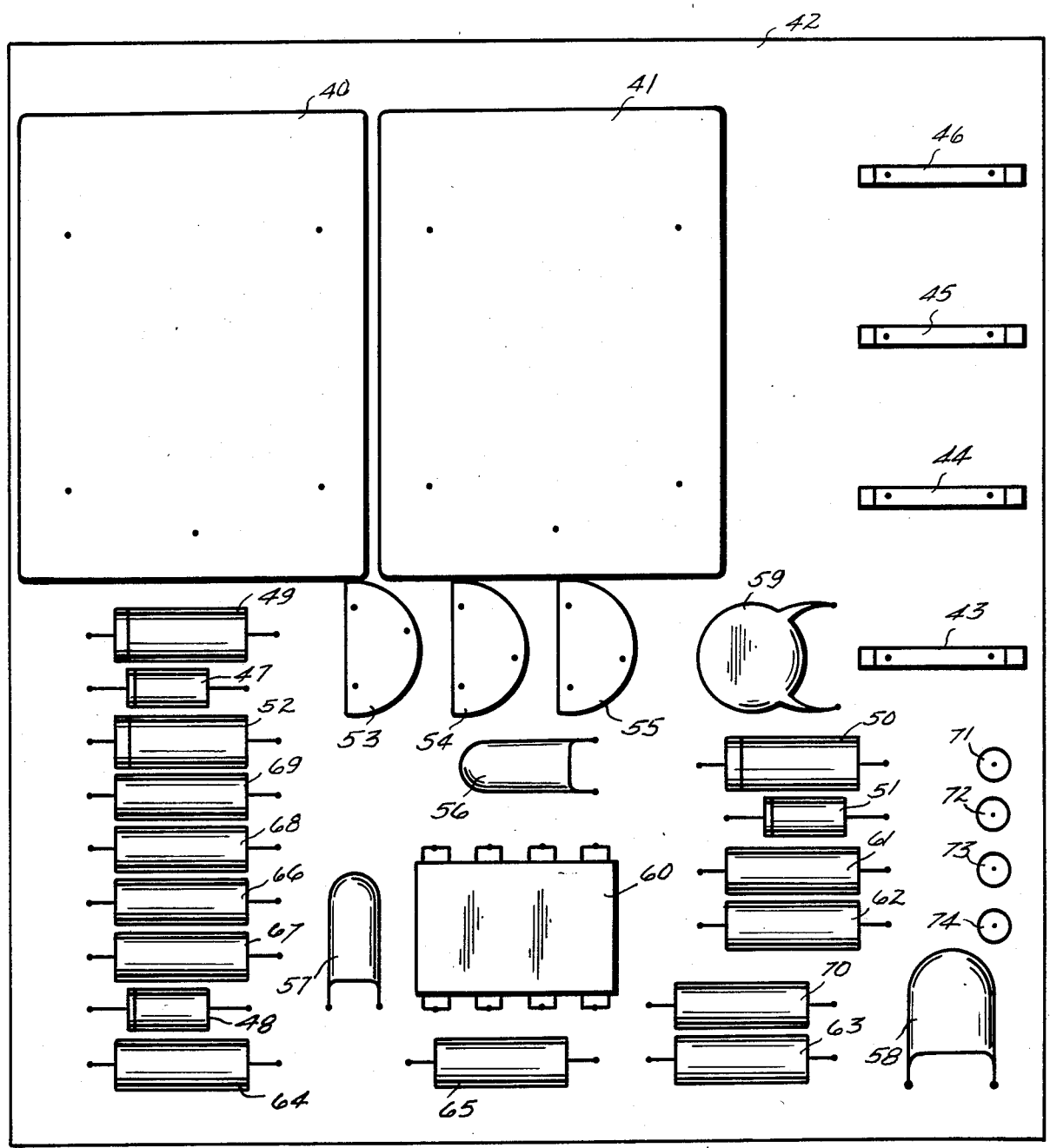
FIG. 3 is a top plan enlarged view of the circuit components on the circuit board of the present invention and indicating contact with the printed circuit thereof.

In general, the present invention is a control structure for an electric powered downrigger to achieve an automatic stop of the driven spool or winch in the UP mode in which the electrically conductive cable includes an electrically nonconducting link at the terminal end of the cable and the link is then connected to a mass or weight, sometimes called a "cannonball," useful in downrigger type fishing. The cable is electrically conductive. A sensing control monitors conductivity of the cable when the cable is in the water and monitors the cessation of conductivity in the cable upon withdrawal from the water and thereupon electronically disables the electric drive power to the electric powered spool when the conductivity ceases as the mass is lifted.

In the device of the present invention, a normal powered downrigger is modified by the inclusion of a driving control circuit obeying two switches. One switch is an "UP" switch. The other switch is a "DOWN" switch. Both switches are manually shifted. The "DOWN" switch lowers the mass on the cable into the water and selectively moves the "cannonball" downwardly to a selected depth. Release of the "DOWN" switch stops the motor driving the downrigger. Selection of fishing depth may be by means of a depth counter; a cable-visible signal as a piece of tape; or by other and well-known means not a part of the present invention. The activation of the "UP" switch cannot occur unless the neutral "UP" switch position is manually overrun and unless the cable is in electrical circuit-making contact in the water. Then, with cable in the water, the "UP" switch is in automatic mode and the motor lifts the "cannonball" until the cable circuit is broken by the insulating link emerging from out of the water. This automatic mode is maintained to the break of the cable circuit unless the "DOWN" switch is engaged. Momentary engagement of the "DOWN" switch during upward movement of the "cannonball" results in stoppage of the lifting. Continuous engagement of "DOWN" switch allows the "cannonball" to be dropped in an unwinding of cable from the winch. Re-engagement of the "UP" switch at any point resumes the automatic ascent of the "cannonball" or mass to the automatic stop when the link breaks the control connection. Manual override of the "UP" switch will result in further lifting, as desired.

Direct current power is directed to the winch or drive motor of the spool on which the cable is wound. The two switches, "UP" and "DOWN," select the direction of movement of the "cannonball," "UP" or "DOWN." A sensing control circuit provides a pilot function based on the continuity of direct current flow sensed through the cable, through the water and through the boat hull to and through the electronic circuitry. When the conductivity is interrupted, then the "UP" function of the power circuit ceases.

SPECIFIC DESCRIPTION

Referring to the drawings and with first reference to FIG. 1 thereof, the operation and setting of use of the present invention can be broadly appreciated. The downrigger 11 of the present invention includes the base or frame 12, the spool or reel 13, the mechanism housing or cover 14, the extension arm 15 in socket 16, the rod holder 17, the reversible drive motor 18, the electrically conductive cable 19, the UP switch 20 and DOWN switch 21. Control circuitry 23 is positioned inside the cover 14. The downrigger 11 is securely mounted as to a boat or craft 24 so that the extension arm 15 of downrigger 11 projects outwardly of the boat 24 in a generally horizontal orientation and with the cable 19 going over the roller sheave 25 mounted on the swivel 26 and the terminal projecting end 27 of the arm 15 to connection to a mass or weight (sometimes called "cannonball") 28 by means of a nonconducting link 29. An electrical contactor 30 from the sensing circuit 23 extends to continuous contact with the electrically conducting shaft 31 and to which the cable 19 is attached on the spool 13. A grounding contact lead 32 extends from the circuit 23 to electrical contact with the water 33 as by a ground contact plug 34 or some electrically conductive portion of the boat 24. For example, a metal propeller drive shaft (not shown) or the like. By trailing the lead 32 in the water, a satisfactory operating condition is obtained but chance contact with the cable 19 or moving parts of the boat 24 by the lead 32 does not provide a preferred operating system.

When the downrigger 11 is being used for fishing, the fishing line 35 is carried to the fishing depth selected by the positioning of the mass or weight 28. The fishing line 35 is releasably secured to the mass 28 and trails the lure and bait as positioned on the hook 36. When a fish strikes the hook 36, then the line 35 is released (pulled free) and the fish is then played by tackle, such as a rod and sporting reel (not shown), and the rod may be conveniently socketed in the rod holder 17. At the point of release it is desirable to lift the mass or weight 28 and clear it from fouling the retrieval of the fish. The UP switch 20 is activated and the motor 18 drives winch or spool 13 with cable 19 and when the link 29 leaves the water 33, the continuity circuit of cable 19, water 33, contactor 30, and lead 32 through conducting element 34 is broken and the break is sensed by the circuit 23 which shuts off power to the motor 18.

The preferred form of nonconducting link 29 is best seen in FIG. 2 where the cable 19 is connected to a snap swivel 37 and the swivel 37 is connected to an eye ring 38 of the link 29. The body 38 of the link 29 is made up of electrically nonconducting material, such as rubber, vinyl, or other suitable plastic from which a tether ring 39 depends for suitable connection to the ball or mass 28 or to cable strip 19' where the selection of the positioning of the link 29 is intermediate the ends of cable 19.

Other connecting arrangements well-known in the art may be used and may include a fishing line disconnect tab responsive to selected or set tension release.

Referring to the FIG. 3, the compactness of the control circuit is appreciated by the enlarged diagram (approximately four times) of the circuit board 42 which is directly mountable in room unoccupied in the frame housing 14 and including the connections to the UP and DOWN switches 20 and 21, respectively. The board 42 (location 23 in FIG. 1) provides power leads to the motor 18 and the contactor 30 and water grounding lead 32 to the conducting plug 34. The motor 18 is driven by direct current, as from a battery, and a much lower voltage direct current provides energization of the sensing circuit when the cable 19 is immersed in the water 33. In the FIG. 3 the relays 40 (UP) and 41 (DOWN) are mounted on the printed circuit board 42 and act in accord with manual and sensed direction to feed power to the motor 18. Elements 43, 44, 45 and 46 are the power input and output connectors. Connectors 43 and 44 run to the winch motor connectors. Elements 45 and 46 provide direct current power into board 42 of circuit 23. Diodes (Type IN 4001) 49, 50, 52 and (Type IN-914) 47, 48 and 51 are indicated in assembled position. The transistors 53 and 54 are specified as 2N4401 having option 2N3904 and the transistor 55 is specified as 2N3906. The capacitor 56 is a 10MFD 16 v. unit. The capacitors 57 and 58 are 1 MFD 16 v. units. The element 59 is specified as a MOV (Metal Oxide Varistor) 22 VDC-MARCON TNR7G270K.

Integrated circuit (dual operational amplifier) element 60 is designated as Type LM358N. The resistors 61, 62 and 63 are 2.2K, ¼ Watt elements. The resistor 64 is a 20K, ¼ Watt unit, the resistors 65, 66 and 67 are 47K, ¼ Watt elements. Resistors 68, 69 and 70 are 100K, ¼ Watt resistors. Outgoing wire leads 71, 72, 73, and 74 are connected as common (71) UP (72), DOWN (73), and 74 to cable contactor 30 (FIG. 1).

Figure 4:
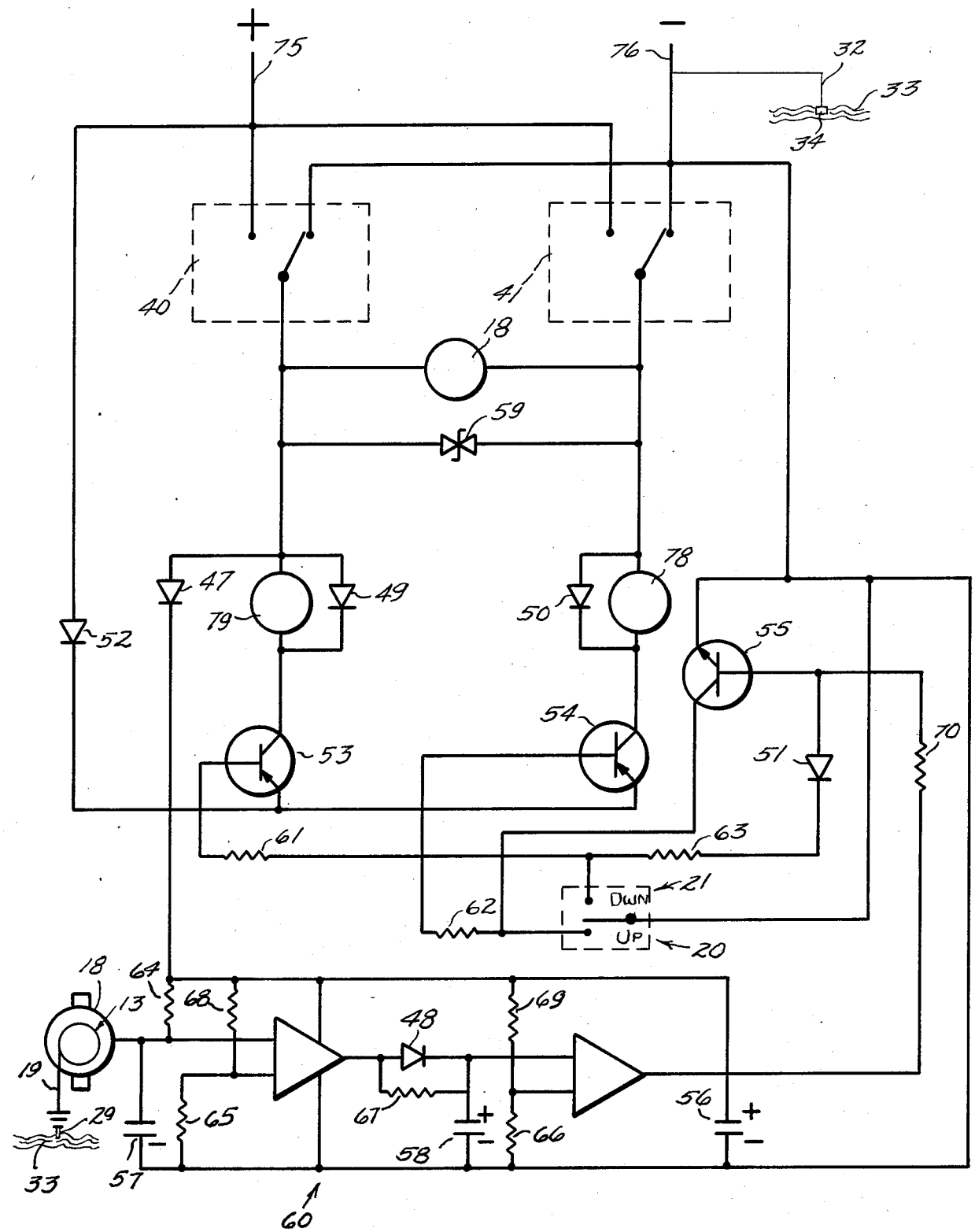
FIG. 4 is a schematic wiring diagram of the simple circuit for control of the present invention.

By reference to FIG. 4, the interrelationship of the circuit components in FIG. 3 can be appreciated by reference to the actual wiring of the circuit 23 on board 42 in relation to the downrigger electric motor 18 and the UP switch 20 and DOWN switch 21 shown schematically as a single pole, double throw switch and the cable 19 which extends into the water 33. The direct current power leads 75 and 76 enter the control system carrying 12 Volts of direct current from a battery of direct current generator means (not shown) with polarity, as indicated. The negative side is connected to the lead 32 and thence to the water 33 as at conducting plug 34 (FIG. 1).

Dual operational amplifier in integrated circuit 60 provides continuous amplification of the weak signal continuity condition when cable 19 is immersed in water. The coils 78 and 79 serve, respectively, the relay 40 (UP) and the relay 41 (DOWN). These diodes 50 and 49 prevent transients from entering circuitry caused by collapsing fields of the coils 78 and 79 of the relays 40 and 41.

The capacitor 57 is essentially a noise suppressor and the resistance 64 provides a signal reference for the amplifying circuit 60. The dividing network of diode 48, capacitor 58 and resistors 66, 67, and 69 are intermediate the indicated amplifying stages of the integrated circuit 60. The varistor 59 serves as a transient voltage suppressor.

In operation, the circuits illustrated in FIG. 4 achieve, in combination with the continuity break in the nonconducting link 29, a very simple automatic UP stop when the cable 19 leaves the water at the link 29. The stop function is electrical and the control is via the relays 40 and 41 operating in accord with the switches 20 and 21 initiating the UP and DOWN required motion of the winch or spool 13.

Having thus disclosed my invention and a most preferred form thereof, others may make improvements, changes and modifications and such improvements, changes and modifications are intended to be included herein limited only by the scope of my hereinafter appended claims.

I claim:

1. In an electric powered downrigger, the control structure therefor comprising:
    an electric powered spool;
    an electrically conductive cable operably secured at one end to said spool and movable by said spool upwardly and downwardly;
    an electrically nonconducting link extending from the terminal other end of said cable;
    a mass connected to the lower terminal end of said link;
    an electronic sensing control comprising a transistorized and amplified circuit monitoring conductivity of said cable when said cable is in water and monitoring a cessation of conductivity in said cable and thereupon disabling electric drive power to said electric powered spool when conductivity in said cable ceases.

2. In the combination of claim 1 including a manually operable override switch in said electronic control whereby lifting of said mass is selectively terminable by said manual switch.

3. In the combination of claim 1 including a downer switch connected to said electric powered spool which switch, upon activation, lowers said mass to a selected depth.

4. In the combination of claim 1 including a switch providing selected manual control of said electric powered spool in upward and downward movement and in self-limiting control upon cessation of signal in said electronic sensing control.

5. An electrical stop means for use in controlling the lift of a trolling mass in downriggers comprising:
    an electrically conductive cable;
    a power winch connected to said cable at one end of said cable;
    a nonconducting link selectively attached to said cable and at the other end and forming a breaker when said cable above said nonconducting link is lifted clear of water;
    a control circuit for said winch and selectively raising and lowering said trolling mass and said cable;
    a source of electrical energy running to said control circuit;
    an electronic sensing control comprising a transistorized and amplified circuit functioning at low power and connected to said winch and said first recited end of said cable and to said water and acting as a switch for said control circuit when said winch is powered to lift said weight and in conductive relationship as between said cable and water in which said cable is immersed breaking said control circuit when said nonconducting link is lifted from the water.

6. In the combination of claim 5 wherein said electronic sensing control operates on a low voltage amplified signal selectively and is automatically broken when said nonconducting link leaves the water.

* * * * *